United States Patent [19]

Lipoff

[11] Patent Number: 4,529,941
[45] Date of Patent: Jul. 16, 1985

[54] FSK DEMODULATOR UTILIZING MULTIPLE-PHASE REFERENCE FREQUENCIES

[75] Inventor: Stuart J. Lipoff, Newton, Mass.

[73] Assignee: Arthur D. Little, Inc., Cambridge, Mass.

[21] Appl. No.: 445,294

[22] Filed: Nov. 29, 1982

[51] Int. Cl.³ .............................................. H03D 3/06
[52] U.S. Cl. .................................. 329/112; 329/126; 375/82; 375/88
[58] Field of Search ............... 329/107, 110, 112, 124, 329/126, 129, 146, 167; 375/45, 47, 82, 88, 90

[56] References Cited

U.S. PATENT DOCUMENTS

| | | | |
|---|---|---|---|
| 3,555,428 | 1/1971 | Perreault | 375/82 |
| 4,247,943 | 1/1981 | Malm | 375/82 X |
| 4,290,140 | 9/1981 | Malm | 375/82 X |
| 4,322,851 | 3/1982 | Vance | 375/88 |

OTHER PUBLICATIONS

Torrey, W. "Linear Phase Detector With Digital Circuits", IBM Tech. Disclosure Bulletin, v. 15, No. 12 (May 1973), pp. 3862-3863.

*Primary Examiner*—Eugene R. LaRoche
*Assistant Examiner*—Robert J. Pascal
*Attorney, Agent, or Firm*—Richard J. Hammond; George W. Dishong

[57] ABSTRACT

FSK demodulator apparatus in accordance with the teachings of the present invention is provided wherein the input signal to be demodulated is phase compared with a plurality of reference phases of the mark and space frequencies to be detected to bracket the input signal within a particular quadrant for the frequency involved. The results of each phase comparison are then integrated with respect to time and threshold compared in such a manner that one or more phase comparison outputs, each having a duty cycle not equal to 50%, will be produced for the frequency involved, resulting in an output from the threshold comparison. This output may then be employed to establish a logic condition indicative of the frequency then being received.

25 Claims, 16 Drawing Figures

4,529,941

FSK DEMODULATOR UTILIZING MULTIPLE-PHASE REFERENCE FREQUENCIES

BACKGROUND OF THE INVENTION

This invention relates to frequency shift key demodulator apparatus, and more particularly, to FSK demodulator apparatus which employs digital correlation techniques to enable asynchronous demodulation of FSK signals in a manner consistent with low cost custom semiconductor integration.

Frequency shift key signals result when a carrier is modulated with data by shifting its frequency between two distinct levels, known as mark and space tones or frequencies, based upon the status of the data otherwise transmitted. This form of modulation is frequently employed for purposes of transmission of data over telephone lines or the like, and the decoupling of such data from the transmission medium must be attended by appropriate demodulation at the receiver or within a modem coupling the receiver to the telephone line.

Prior art techniques for the demodulation of FSK signals have generally taken the form of analog filtering approaches, or alternatively, closed loop, phase or frequency-locked decoding techniques have been employed. Each technique results in relatively expensive demodulation equipment which does not readily admit of fabrication through monolithic integrated circuit techniques, and while the same may be adjusted for a high degree of accuracy, they are subject to drift. Hence, demodulators configured in this manner do not manifest a high degree of precision over extended periods of time.

For instance, when analog techniques are employed, the problem of detection of known signals having an unknown phase is approached upon an asynchronous basis employing analog filters and circuitry. Typically the signal to be demodulated is applied to a pair of analog filters, each of which has a passband centered at the mark and space tones of the FSK signal being received. The filters must have a well-defined yet relatively narrow passband and detection is based upon a sensing of the output of each filter. The filter having the largest output is employed for purposes of indicating the presence of the particular mark or space tone associated therewith. Often, the design of such filters is extremely laborious and must be attended by much in the way of signal conditioning circuitry and the like. The resulting demodulator apparatus is expensive to fabricate and does not readily admit of known monolithic integrated circuit techniques on a single substrate. Furthermore, while adjustment of demodulator apparatus of this type can be highly accurate, such apparatus is subject to drift, and hence, precise demodulation of incoming information cannot be reliably achieved over extensive periods of time or through variations in temperature without periodic readjustment of the equipment.

Similarly, when phase or frequency-locked loops are employed for purposes of demodulating FSK information, highly precise closed loop feedback techniques must be employed, and the bandwidth of the phase-locked loop must be generally wider than optimum detection width. This means that FSK demodulators employing phase-locked loop techniques are highly susceptible to interference. Additionally, the resulting analog circuitry is generally difficult to design and costly to implement. These circuits too are not well-suited for implementation through use of conventional monolithic integrated circuit techniques on a single substrate.

Therefore, it is an object of the present invention to provide FSK demodulator apparatus employing open loop digital correlation techniques to achieve highly precise demodulation which is not subject to drift.

A further object of the present invention is to provide FSK demodulator apparatus which is inexpensive to manufacture and readily admits of fabrication as a single substrate monolithic integrated circuit implemented in MOS or bipolar technologies.

Another object of the present invention is to provide FSK demodulator apparatus employing asynchronous, open loop demodulation techniques. An additional object of the present invention is to provide FSK demodulator apparatus which may be readily incorporated within a high speed modem for operation in a dial-up voice telephone network at speeds of up to 1200 baud in a half-duplex mode.

Various other objects and advantages of the present invention will become clear from the following detailed description of several exemplary embodiments thereof and the novel features will be particularly pointed out in conjunction with the claims appended hereto.

SUMMARY OF THE INVENTION

In accordance with the teachings of the present invention, FSK demodulator apparatus is provided wherein an input signal to be demodulated is phase compared with a plurality of reference phase components of mark and space frequencies to be detected to bracket said input signal within a particular quadrant for the frequency involved; the results of each phase comparison are then integrated with respect to time and threshold compared in such a manner that one or more asymmetrical outputs, that is phase comparison outputs each having a duty cycle not equal to 50%, will be produced for the frequency involved, resulting in an output from the threshold comparison; these outputs may then be employed to establish a logic condition indicative of the frequency then being received.

BRIEF DESCRIPTION OF THE DRAWINGS

The invention will be more clearly understood by reference to the following detailed description of an exemplary embodiment thereof in connection with the accompanying drawings in which.

DETAILED DESCRIPTION

While the instant invention is of general application, it should be understood at the outset that the implementation thereof as a single substrate monolithic integrated circuit implemented in MOS or bipolar technologies at low cost for possible inclusion within a half-duplex telephone modem is envisioned as a principal application thereof. Therefore, the logic which is disclosed is configured in a form suitable for implementation in such monolithic integrated circuits, it being recognized that should other forms of integrated circuits, hybrid circuits or discrete components be utilized, other forms of logic components which perform the same resulting functions could be used as well. Similarly, while the instant disclosure proceeds to disclose the instant invention under circumstances where positive logic is generally employed, the same circuit functions may be readily achieved through the use of complementary logic without deviating a whit from any of the principals disclosed herein. The FSK demodulator apparatus disclosed herein is viewed as highly advantageous in applications wherein a low cost, high-speed demodulator suitable for operation over dial-up voice telephone networks or the like at speeds of up to 1200 baud or less, in a half-duplex mode, is desired.

Figure 1:
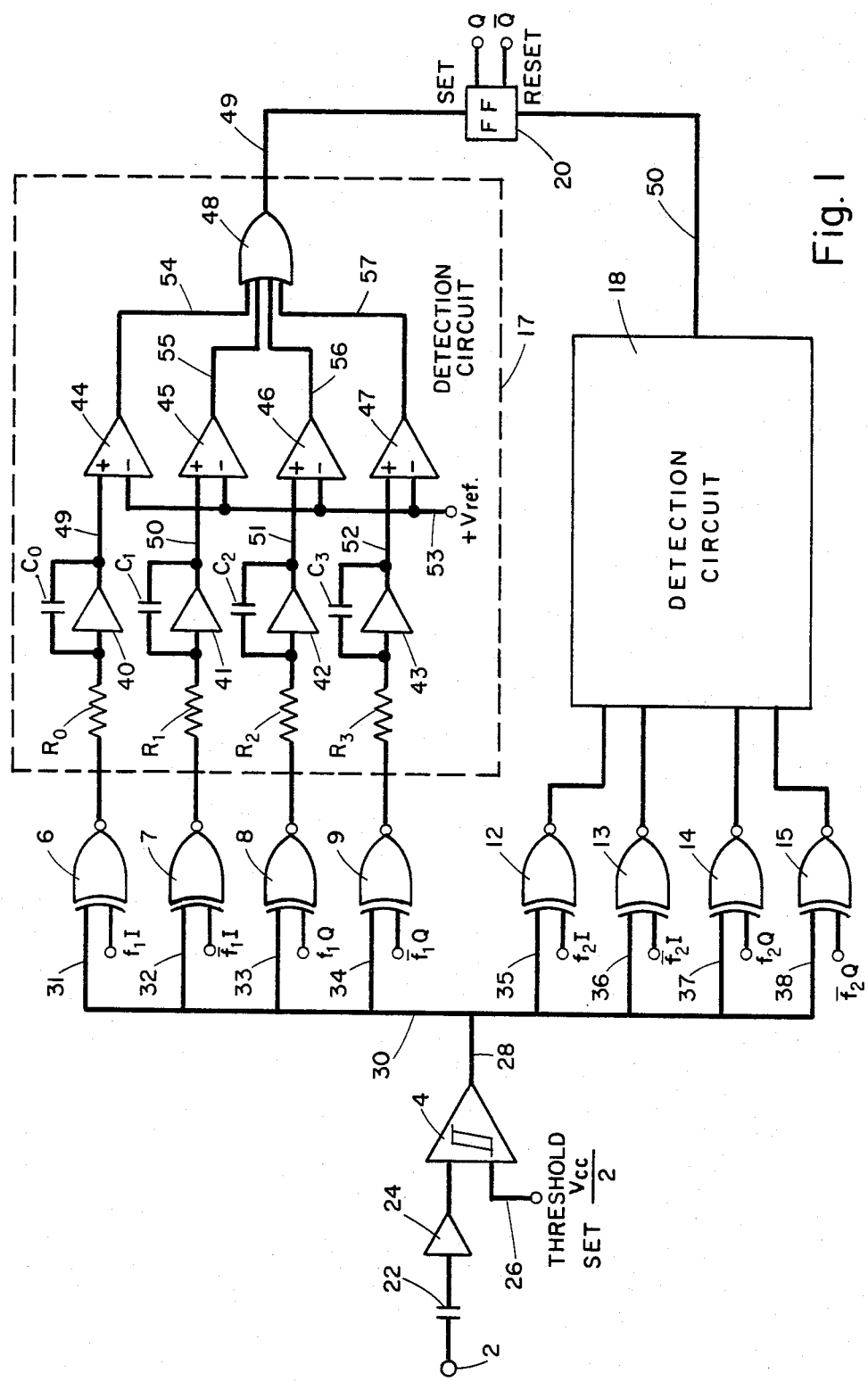
FIG. 1 is a block diagram schematically illustrating an exemplary embodiment of FSK demodulator apparatus according to the present invention.

Referring now to FIG. 1, there is shown a block diagram schematically illustrating an exemplary embodiment of FSK demodulator apparatus according to the present invention. The FSK demodulator apparatus illustrated in FIG. 1 comprises an input terminal 2 for receiving FSK modulated information to be decoded, a threshold detector 4 therefor, a first plurality of exclusive NOR gates 6–9 for decoding a first FSK frequency or tone $f_1$, a second plurality of exclusive NOR gates 12–15 for decoding a second FSK frequency or tone $f_2$, first and second detector circuits 17 and 18 for detecting the presence of a first $f_1$ or second $f_2$ FSK frequency or tone, and flip-flop means 20 for indicating a first $f_1$ or second $f_2$ frequency or tone present in an FSK signal being received.

The input terminal 2 is adapted to receive FSK modulation from a telephone system or any other media through which these signals are being conveyed to a receiver or the like. As will be appreciated by those of ordinary skill in the art, FSK modulated signals will contain $f_1$ and $f_2$ frequencies or tones corresponding to mark and space signals which, in theory, could be any frequencies and typically exhibit a ratio which is roughly two to one. For instance, in a typical telephone system employing FSK transmission techniques, the $f_1$ frequency could be approximately 1200 Hz and the $f_2$ frequency or tone could be 2400 Hz in terms of the nominal frequency values of $f_1$ and $f_2$. For purposes of the instant disclosure, nominal frequency values for $f_1$ and $f_2$ of 1200 and 2400 Hz will be assumed; however, it will be readily appreciated by those of ordinary skill in the art that any values within the frequency range of the transmission media being employed could be adopted.

The FSK signal information thus applied to the input terminal 2 is conveyed to the threshold detector means 4 through a capacitor means 22 and a linear amplifier means 24. The function of the capacitor means 22, as will be readily apparent to those of ordinary skill in the art, is to DC filter the FSK input supplied to the input terminal means 2 so that any DC component associated with such input is removed. Thereafter, the input is applied to the linear amplifier means 24 and thereafter to the threshold detector means 4. The linear amplifier means 24 may take any of the conventional forms of this well-known class of device; however, as integrated circuit processes are contemplated herein, and the capacitor 22 is being employed for purposes of driving the linear amplifier means 24, the well-known property of integrators implemented in integrated circuit processes may be employed to achieve this function by simply placing a resistor of appropriate value across the input and output of the linear amplifier means 24. Thus, in this manner, the linear amplifier may be implemented on a single IC chip rather than having to provide a separate operational amplifier or the like and the separate gain associated therewith. When this is done, the entire circuit illustrated in FIG. 1 to the right of the capacitor means 22 may be implemented on a single chip using integrated circuit techniques. Under these circumstances, the input is DC floating and the linear amplifier means 24 acts as a high gain linear amplifier.

The threshold detector 4 may take any of the conventional forms of this well-known class of device which acts to compare the analog input applied thereto from the linear amplifier means 24 to a predetermined threshold level and to provide an output therefrom only when the threshold is exceeded. The threshold established for the threshold detector 4 is determined by the voltage level placed on the input conductor 26 connected to the threshold detector 4. In the case of the digital system here being discussed, a 0 to 5 volt system driven from a single ended D.C. supply, wherein a digital 0 corresponds to 0 volts, and a 1 level corresponds to 5 volts, may be assumed. Therefore, an appropriate level for purposes of establishing the threshold level for the threshold detector 4 may be assumed to be $V_{cc}/2$ or 2.5 volts, and this is the voltage level which typically may be applied to the input conductor 26.

The threshold detector means 4 also acts, in the manner well-known to those of ordinary skill in the art, to provide a shaping function for the amplified analog input signal applied thereto so that the analog signal received results, after shaping and level detection by the threshold detector 4, in an analog waveform which has been squared off and corresponds in frequency to either an $f_1$ or $f_2$ tone associated with space or mark tones whose phase is unknown. Thus, the output of the threshold detector 4 as applied to the conductor 28 will take the form of an analog signal whose frequency is either $f_1$ or $f_2$ within some error tolerance and of unknown phase so that detection must proceed upon the basis of detecting a known frequency, i.e., $f_1$ or $f_2$, having an arbitrary phase.

The output of the threshold detector 4 on conductor 28 is further applied through the conductors 30–38 to a first input of the first and second pluralities of exclusive NOR gates 6–9 and 12–15 which act, respectively, to decode the presence of the first or second frequencies $f_1$ and $f_2$. More particularly, the first plurality of exclusive NOR gates 6–9 act to phase compare the input signal supplied thereto on conductors 31–34 to a reference $f_1$ signal phased for each of the four quadrants. Thus, as indicated at the input to the exclusive NOR gate 6, annotated $f_1I$, a zero-phased $f_1$ signal is applied as a reference signal to the exclusive NOR gate 6. Similarly, as indicated by the input terminal annotated $\bar{f}_1I$, a complementary $f_1$ signal phased for 180° is applied to the reference input of the exclusive NOR gate 7. In like manner, as indicated by the input annotated $f_1Q$ to the exclusive NOR gate 8, the quadrature component of the $f_1$ signal is supplied to the exclusive NOR gate 8, while the exclusive NOR gate 9 receives the complement of the quadrature input of the $f_1$ signal at the terminal annotated $\bar{f}_1Q$.

Each of the second plurality of exclusive NOR gates 12–15 receives, in like manner, an appropriately phased reference signal for the $f_2$ frequency signal. Thus, inputs annotated $f_2I$, $\bar{f}_2I$, $f_2Q$ and $\bar{f}_2Q$ are applied to the exclusive NOR gates 12–15, respectively, so that if the input signal contains an $f_2$ tone, its phase may be compared with the four quadrature reference signals supplied to the second plurality of exclusive NOR gates for decoding of the second frequency. In this manner, it will be appreciated that the first plurality of exclusive NOR gates 6–9 acts for the purposes of decoding the presence of the $f_1$ frequency or tone, while the second plurality of exclusive NOR gates 12–15 acts on the signal information supplied thereto for purposes of decoding the presence of the $f_2$ frequency or tone.

Each of the exclusive NOR gates 6–9 and 12–15 acts in the conventional manner associated with this well-known class of logic device to provide a low or 0 at the output thereof when only one of the inputs thereto is high, while providing a high or 1 output for all other input conditions. Therefore, as each of the exclusive NOR gates 6–9 receive an $f_1$ component signal and each of the exclusive NOR gates 12–15 receive an $f_2$ component signal, it will be appreciated by those of ordinary skill in the art that the plurality of NOR gates 6–9 serve to process an input signal supplied to the terminal 2 under conditions where an $f_1$ frequency or tone of unknown phase is present, while the exclusive NOR gates 12–15 serve to process an input signal applied to the terminal 2 containing an $f_2$ frequency or tone of unknown phase. The manner in which the reference frequency signals applied to the exclusive NOR gates 6–9 and 12–15 are generated will be discussed in greater detail below in connection with FIG. 2; however, here it is sufficient to appreciate that the reference inputs supplied to the exclusive NOR gates 6–9 and 12–15 have the following meaning:

$f_1I$ = frequency $f_1$, in phase.
$\bar{f}_1I$ = frequency $f_1$, in phase, complement.
$f_1Q$ = frequency $f_1$, quadrature phase, 90° shift.
$\bar{f}_1Q$ = frequency $f_1$, quadrature phase, 90° shift, complement.
$f_2I$ = frequency $f_2$, in phase.
$\bar{f}_2I$ = frequency $f_2$, in phase, complement.
$f_2Q$ = frequency $f_2$, quadrature phase, 90° shift.
$\bar{f}_2Q$ = frequency $f_2$, quadrature phase, 90° shift, complement.

The inputs supplied to the exclusive NOR gates 6–9 and 12–15 on the conductors 31–38 must take the form of either random noise, an $f_1$ signal of random phase, or an $f_2$ signal of random phase. If random noise is present, the same will probably be of insufficient magnitude to pass the threshold set by the threshold detector 4. However, in any event, any output produced as a result of noise by any of the exclusive NOR gates 6–9 and 12–15 will result in a symmetrical wave form (having a duty cycle of 50%) which will integrate to an output voltage of Vcc/2, which here is 2.5 volts, and hence will not exceed the predetermined threshold (at conductor 53), which is selected to be above (or below) Vcc/2. Similarly, when a coherent $f_1$ frequency or tone is present at the input 2, each of the ouputs of the exclusive NOR gates 12–15 will produce an output waveform that is symmetrical so that, under these conditions too, the integration of the outputs of the exclusive NOR gates 12–15 will produce an output voltage of Vcc/2 which will not exceed the predetermined threshold. However, when a coherent $f_1$ frequency or tone is present at the input 2, the outputs of the exclusive NOR gates 6–9 will produce, after integration, one or more waveforms which will deviate from the reference level $V_{cc}/2$, depending upon the relationship of the phase of the incoming $f_1$ signal to the reference signal ($f_1I$, $\bar{f}_1I$, $f_1Q$ and $\bar{f}_1Q$) applied thereto. Thus, one or more of such waveforms will be of an amplitude which will equal or exceed a predetermined threshold condition. These outputs, then, may be employed to indicate the presence of an $f_1$ tone of random phase.

Furthermore, as will be readily appreciated by those of ordinary skill in the art, when an $f_2$ frequency or tone of random phase is present, the complementary condition to that just described for the presence of an $f_1$ tone will result. This will cause at least one of the exclusive NOR gates 12–15 to produce a non-symmetrical waveform which, when integrated, may be employed to establish a predetermined threshold level. This threshold level then may be employed to indicate the presence of the $f_2$ frequency while each of the exclusive NOR gates 6–9 will produce a symmetrical output waveform which will integrate to the reference level $V_{cc}/2$ associated with the circuit.

The outputs of each of the first plurality of exclusive NOR gates 6–9, which act upon the frequency $f_1$, are connected as indicated to the detection circuit indicated by the dashed block 17, while the outputs of the second plurality of exclusive NOR gates for decoding the second frequency $f_2$ are provided to the detection circuit 18. The first and second detection circuits 17 and 18 are identical, and hence, only the details of the detection circuit 17 have been illustrated in FIG. 1 within the dashed block.

The detection circuit indicated by the dashed block 17 includes a plurality of integrators 40–43, a plurality of comparator means 44–47 and an OR gate 48 for processing in-phase and quadrature frequency components decoded by the exclusive NOR gates 6–7. The integrators 40–43 may take any of the well-known forms of this conventional class of device which act, in the usual manner, to time average an input signal applied thereto. The time constant for each of the integrators 40–43 is established, in the conventional manner, by a serial connected input resistor $R_0$–$R_3$ and a capacitor $C_0$–$C_3$ connected between the input and output of the device in the manner indicated in FIG. 1. The RC time constant for each of the integrators 40–43 may be the same and the time constant established is preferably on the order of the reciprocal of the data rate to be detected. Thus, in the case of the detection circuit indicated by the dashed block 17, the time constant associated with integrators 40–43 would be 1/1200, and similarly, the time constant for the corresponding integrators within the detection circuit 18 may be assumed to be on the order of 1/2400.

The inputs to each of the integrators 40–43 are connected, respectively, through the resistors $R_0$–$R_3$ to the outputs of the exclusive NOR gates 6–9 so that the digital output thereof is integrated with respect to time.

Thus, as plainly shown in FIG. 1, the integrator 40 receives the output of the exclusive NOR gate 6, the integrator 41 receives the output of the exclusive NOR gate 7, the integrator 42 receives the output of the exclusive NOR gate 8 and the integrator 43 receives the output of the exclusive NOR gate 9. In this manner, each of the in-phase and quadrature components of an input signal being received, as decoded by the exclusive NOR gates 6-9 is independently integrated with respect to time by an associated one of the integrator means 40-43.

The outputs of each of the integrator means 40-43 are connected through the conductors 49-52 to a first input of a respective one of the comparator means 44-47 in the manner indicated in FIG. 1. The comparator means 44-47 may each take the conventional form of a threshold detector such as the threshold detector 4 already described. Alternatively, any of the well-known forms of differential amplifier means may be employed so long as each of the comparator means 44-47 act in the well-known manner to compare the input provided thereto on conductors 49-52 with a predetermined threshold and provide an output only when such threshold is exceeded. In the case of the comparator means 44-47, a common threshold is established for each device by the common connection of one of the inputs thereto to a reference level $V_{ref}$ as applied through the conductor 53. The threshold established for each of the comparator means 44-47 by the reference level $V_{ref}$ may here be selected at a level intermediate the circuit reference level $V_{cc}/2$ and either a 1 or 0 value, depending upon the choice of the designer. But, for the circuit illustrated in FIG. 1, wherein a 0 is established at 0 volts, a 1 is established at 5 volts and the reference circuit value $V_{cc}2$ is approximately 2.5 volts; the threshold value established for the threshold detectors 44-47 would be between the 2.5 volt reference circuit value and 5.00 volts, for example 3.75 volts. Therefore, assuming a value intermediate 2.5 volts and 3.75 volts were selected for $V_{ref}$, any time a value exceeding this reference level was produced at one of the integrators 40-43 on conductors 49-52, an output corresponding to a high level would be produced at the corresponding one of the comparator means 44-47 on a respective one of the conductors 54-57.

The outputs of the comparator means 44-47 are connected through the conductors 54-57 to respective inputs of the OR gate 48. The OR gate 48 may take any of the well-known forms of this conventional class of device which acts to provide a 1 or a high at the output thereof whenever any of the inputs thereto go high, producing a low only when all inputs thereto are low. Thus, whenever a high is present on any of input conductors 54-57, a 1 will be produced at the output of the OR gate 48 which is connected to the conductor 49.

An inspection of the detection circuit indicated by the dashed block 17, will readily reveal that whenever an $f_1$ frequency tone of random phase is supplied to the input terminal 2, asymmetrical waveforms will be produced from one or more of the outputs of the exclusive NOR gates 6-9, depending upon the random phase of the frequency present at the input terminal 2. For instance, if it is assumed that the input frequency $f_1$ is supplied perfectly in phase, it will be seen in FIG. 4b that the output of the exclusive NOR gate 6 will be 1, and in FIG. 4c that the output of the exclusive NOR gate 7 will be 0, and in FIGS. 4d and 4e the outputs of the exclusive NOR gates 8 and 9 will be opposite, symmetrical waveforms having half their cycle between 1 and 0. Thus, under these circumstances, the output of integrator 40 will be 1 or $V_{cc}$, the output of integrator 41 will be 0, while the outputs of integrators 42 and 43 will be 2.5 volts or $V_{cc}/2$. This means that only the output of integrator 40 will build to a value exceeding the threshold level set for the comparator 44 as it builds to a value of $V_{cc}$ or approximately 5 volts. When the threshold of the threshold detector 44 is overcome, a one level will be provided at the output thereof connected to the conductor 54 and this, in turn, wll cause a one to be produced at the output of OR gate 48 connected to the conductor 49. No outputs, under these circumstances, will be produced on conductors 55-57.

Similarly, if $\theta$ is the phase difference in radians between a received $f_1$ signal and any one of the reference signals $f_1I$, $\bar{f}_1I$, $f_1Q$, the output of the single integrator 40, 41, 42 or 43 associated therewith in terms of the average DC voltage of the output of that integrator can be represented as $V_A$, where:

$$V_A = |V_{cc} - V_{cc}(\theta/\pi)|$$

Typical values for $V_A$ for variations in $\theta$ from 0 to $2\pi$ then may be seen in the table below.

TABLE

| $\theta$ | $V_A$ |
|---|---|
| 0 | $V_{cc}$ |
| $\pi/4$ | $\frac{3}{4} V_{cc}$ |
| $\pi/2$ | $V_{cc}/2$ |
| $\frac{3}{4}\pi$ | $\frac{1}{4} V_{cc}$ |
| $\pi$ | 0 |
| $5/4\pi$ | $\frac{1}{4} V_{cc}$ |
| $3/2\pi$ | $\frac{1}{2} V_{cc}$ |
| $7/4\pi$ | $\frac{3}{4} V_{cc}$ |
| $2\pi$ | $V_{cc}$ |

An analysis of the various random phases available to the $f_1$ frequency or tone will readily reveal that, regardless of the phase involved, an asymmetrical waveform will be produced at at least one of the exclusive NOR gates 6-9, which waveform will reside at a 1 level for more than half of the duty cycle of the $f_1$ tone. This will result in an output from at least one of the integrators 40-43 which exceeds the value $V_{ref}$ to produce a 1 output on conductor 49. Thus, regardless of the phase of the $f_1$ frequency involved, the threshold level associated with one of the comparators 44-47 will be overcome. When this occurs, a one level is supplied by the OR gate 48 to the output conductor 49.

Conversely, when an $f_2$ waveform is supplied to the input terminal 2, regardless of the phase thereof, each of the exclusive NOR gates 6-9 will produce a symmetrical output which will integrate to the circuit reference level of $V_{22}/2$. Under these circumstances, the outputs of integrators 40-43 will be maintained at the reference level of 2.5 volts, and hence, will never overcome the threshold set at the comparators 44-47. Thus, the output of the OR gate 48 will be a 0. However, while the output of the $f_1$ branch will stay low when an $f_2$ waveform is present, the output of the detection circuit 18 on conductor 50 will go high for the same reasons causing the output of the detection circuit 17 on conductor 49 to go high whenever an $f_1$ frequency tone was present. Thus, when an $f_2$ frequency tone is present, the level on conductor 50 is high while the level on conductor 49 is low.

The outputs of each of the detection circuits 17 and 18 are connected through the conductors 49 and 50 to the flip-flop 20. The flip-flop 20 may take the conventional form of an S-R flip-flop which acts in the well-known manner to be set whenever a high is applied to the set input thereof and to retain this state until such time as it has been reset by a high level supplied to the reset input thereof. The set input to the flip-flop 20 is connected to the conductor 49 while the reset input thereto is connected to the conductor 50. Thus, as will be readily appreciated by those of ordinary skill in the art, whenever an $f_1$ frequency is detected, the Q output of the flip-flop 20 will go high while when an $f_2$ frequency is detected, the $\overline{Q}$ output thereof will go high to indicate, on a binary basis, which of two frequencies sought to be detected within an FSK input is present.

Figure 2:
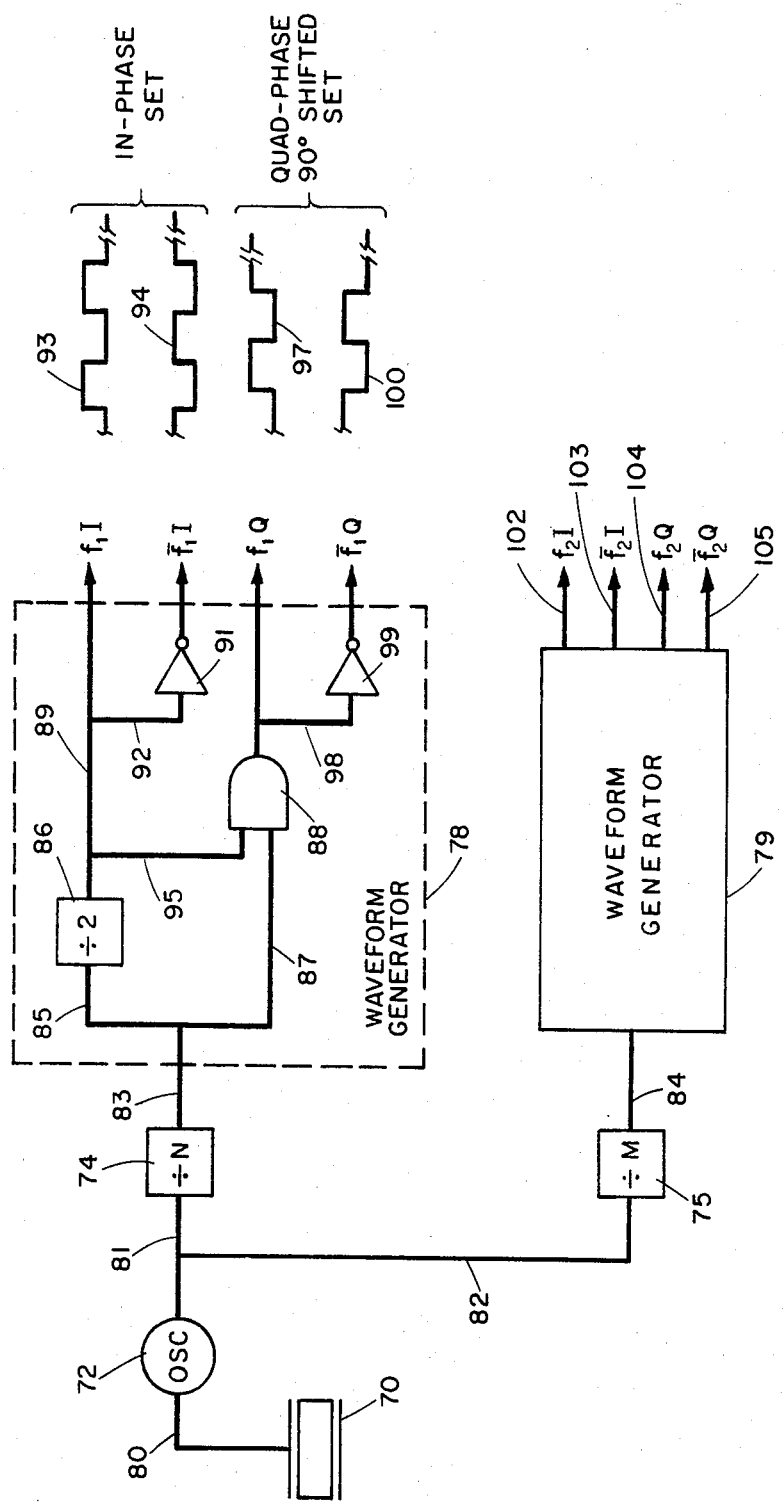
FIG. 2 is a schematic block diagram of a reference waveform generator suitable for use in conjunction with the embodiment of the invention illustrated in FIG. 1.
Figure 3:
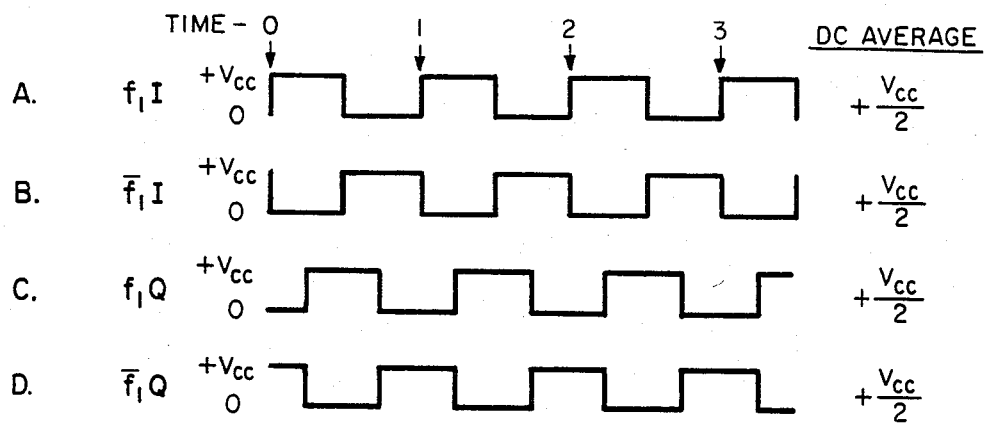
FIGS. 3A–3D are waveforms illustrating the reference frequencies $f_1 I$, $\bar{f}_1 I$, $f_1 Q$ and $\bar{f}_1 Q$, respectively, produced by the waveform generator circuit illustrated in FIG. 2.

Referring now to FIG. 2, there is schematically shown a block diagram of a circuit suitable for generating the reference waveforms supplied to exclusive NOR gates 6-9 and 12-15, as illustrated in FIG. 1. The reference waveform generator circuit illustrated in FIG. 2 comprises an oscillator stabilizing means 70, stabilized oscillator means 72, first and second counter means 74 and 75, and waveform generator circuits indicated by the dashed block 78 and the solid block 79.

The oscillator stabilizing means 70 may take any of the well-known forms of this conventional class of device. For instance, a ceramic resonator or crystal oscillator may be employed or any other device which has an output frequency which is sufficiently high so that when the same is divided by N and M, frequencies of $2f_1$ and $2f_2$, respectively, result. Typically, if a ceramic resonator was employed, a device in the range of 200 KHz might be employed; while if a crystal were utilized, a crystal in the range of 5 MHz or the like could be relied upon. The actual oscillation frequency of the crystal oscillator or resonator is not highly critical as the values of M and N, as shall be seen below, may be freely varied to achieve desired output frequencies of $2f_1$ and $2f_2$.

The output of the oscillator stabilizing means 70 is applied through the conductor 80 to the stabilized oscillator means 72. The stabilized oscillator means 72 may take any of the conventional forms of this well-known class of device which provides a symmetrical square wave output having a frequency defined by the input supplied thereto. The stabilized oscillator means 72 should also provide an output which is relatively free of drift, as well as insensitive to usual ambient conditions.

The output of the stabilized oscillator means 72 is applied through the conductors 81 and 82 to the inputs of the counter means 74 and 75. The counter means 74 and 75 may take any of the well-known forms of this conventional class of device which act to divide the input frequency supplied thereto on conductors 81 and 82 by a desired count. Under these circumstances, it will be readily appreciated that the values of N and M are merely a choice of design calculated to yield an output corresponding to the necessary frequency to be further processed by the circuitry illustrated in FIG. 2.

More particularly, if it is again assumed that the frequency $f_1$ is to correspond to 1200 Hz while the frequency $f_2$ is to correspond to 2400 Hz, the output of the counter means 74 should correspond to $2f_1$ to 2400 Hz while the output of counter means 75 would correspond to $2f_2$ or 4800 Hz. Thus, the values of N and M are selected as a function of the necessary division for the output frequency of the oscillator means 72.

The output of the counter means 74 is supplied through the conductor 83 to the waveform generator indicated by the dashed block 78, while the output of the counter means 75 is applied through the conductor 84 to the waveform generator indicated by the block 79. As both the waveform generators 78 and 79 are identical, only the details of the waveform generator 78 have been illustrated in FIG. 2, it being appreciated by those of ordinary skill in the art that the waveform generator 78 receives an input corresponding to $2f_1$ and provides for quadrant reference signal outputs corresponding to $f_1I$, $\bar{f}_1I$, $f_1Q$ and $\bar{f}_1Q$. Similarly, the waveform generator 79 receives an input frequency corresponding to $2f_2$ and provides the four corresponding $f_2$ reference signals for use by the exclusive OR gates 12-15.

The output frequency $2f_1$ applied to the conductor 83 from the counter means 74 is supplied, as indicated in FIG. 2, through the conductor 85, to a divide-by-two counter 86 and through the conductor 87 to an AND gate 88. The divide-by-two counter 86 may take the conventional form of a two-state counter which acts, as will be readily appreciated by those of ordinary skill in the art, to divide the input frequency supplied thereto on conductor 85 by two. The output of the divide-by-two counter is then directly supplied through the conductor 89 to the output terminal annotated $f_1I$ as the in-phase $f_1$ signal. This signal is further applied to the commonly annotated input of the exclusive NOR gate 6.

Additionally, the output of the divide-by-two counter 86 is supplied through the conductor 92 to an inverter 91. The inverter 91 may take any of the conventional forms of inverter means which act to produce a 180° phase shift in any signal applied thereto and provide the thus complemented signal at the output thereof. This output, as annotated $\bar{f}_1I$, may then be directly applied to the correspondingly annotated input of the exclusive NOR gate 7. The output waveforms associated with the terminals annotated $f_1I$ and $\bar{f}_1I$ are generally indicated by the waveforms 93 and 94 are annotated In-Phase Set.

The output of the divide-by-two counter 86 is also supplied through the conductor 95 to a second input of the AND gate 88. The AND gate 88 may take any of the well-known forms of this conventional class of logic device which acts to produce a high at the output thereof only when both of the inputs thereto are high. Since the input supplied to the AND gate 88 on the conductor 95 corresponds to the $f_1$ signal, while the input supplied thereto on conductor 87 corresponds to a $2f_1$ signal, the ANDing of the $f_1$ and $2f_1$ signals will result in an output corresponding to the quadrature reference frequency for $f_1$ or an $f_1$ waveform whose phase is shifted by 90° from the waveform 93. This is output on the terminal annotated $f_1Q$ in the form indicated by the waveform 97 and may be thus applied to the correspondingly annotated input to the exclusive NOR gate 8.

The output of the AND gate 88 is also supplied through the conductor 98 to the inverter 99. The inverter 99 may correspond in form and function to the inverter 91 and produces at the output thereof a complementary quadrature output signal $\bar{f}_1Q$ whose waveform is illustrated by the waveform 100. This output may be supplied directly to the corresponding annotated input to the exclusive NOR gate 9.

The waveform generator 79 may take precisely the same form as the waveform generator means 78 already discussed above, and hence, acts on the $2f_2$ input signal supplied thereto on the conductor 84 to output the $f_2I$, $\bar{f}_2I$, $f_2Q$ and $\bar{f}_2Q$ reference signals indicated in association with conductors 102-105. These outputs may be connected directly to the correspondingly annotated inputs to the exclusive NOR gates 12-15.

Referring now to FIGS. 3A-3D, there are shown waveforms illustrating, with greater particularity, the reference frequencies $f_1I$, $\bar{f}_1I$, $f_1Q$ and $\bar{f}_1Q$, respectively, produced by the waveform generator circuit illustrated in FIG. 2. More particularly, as will be readily appreciated by those of ordinary skill in the art, the waveforms illustrated in FIGS. 3A-3D correspond to the waveforms 93-100 illustrated in FIG. 2, respectively. In FIGS. 3A-3D, time in terms of cycles is plotted along the abscissa, while the waveform magnitude in terms of volts ranging from 0 to $+V_{cc}$ is set forth along the ordinate. Additionally, in FIG. 3, the DC average values for each waveform are indicated along the right-hand portion of the figure.

Turning now to FIGS. 4A-4E, there are shown waveforms illustrating the operation of the embodiment of the invention illustrated in FIG. 1 under conditions where an in-phase $f_1$ signal, as shown in FIG. 4A, is received. Again, in FIGS. 4A-4E, time is plotted along the abscissa while magnitude in terms of voltage within a range of 0 to $V_{cc}$ is indicated along the ordinate. The waveforms illustrated in FIGS. 4B-4E represent the output of the exclusive NOR gates 6-9, respectively, when an input waveform in the form of an in-phase $f_1$ signal, as indicated in FIG. 4A, is supplied to the input terminal 2.

The DC average of each waveform is again indicated at the right, and in effect, would correspond to the outputs of the integrators 49-52, respectively. For the conditions illustrated, as will be readily appreciated by those of ordinary skill in the art upon a comparison of FIG. 4A and the various waveforms in FIGS. 3A-3D, receipt of the in-phase $f_1$ signal illustrated in FIG. 4A would result in the output of the exclusive NOR gate 6 going to a 1 or $V_{cc}$ level for the duration of the input signal illustrated in FIG. 4A. Consequently, the output of the exclusive NOR gate 7 would to to 0 and retain this level for the duration of the in-phase $f_1$ signal. The outputs of the exclusive NOR gates 8 and 9, as shown in FIGS. 4D and 4E, respectively, take the form of complementary, symmetrical square waves which vary in magnitude between the values of 0 $V_{cc}$.

Under these conditions, as plainly indicated by the average DC values annotated in association with each of the waveforms illustrated in FIGS. 4B-4E, only the output of the integrator 40 would exceed the threshold level $V_{ref}$ associated with each of the comparator means 44-47 in FIG. 1. Thus, only the output of the comparator 44 on conductor 54 would go high to cause the OR gate 48 to produce a 1 at the output thereof and set the flip-flop 20. This occurs, since the output of the integrator 50 will, under these conditions, be 0 while the outputs of the integrator means 42 and 43 will assume a value of $V_{cc}/2$ which is insufficient to overcome the threshold level $V_{ref}$ established for the comparator means 46 and 47.

Figure 4:
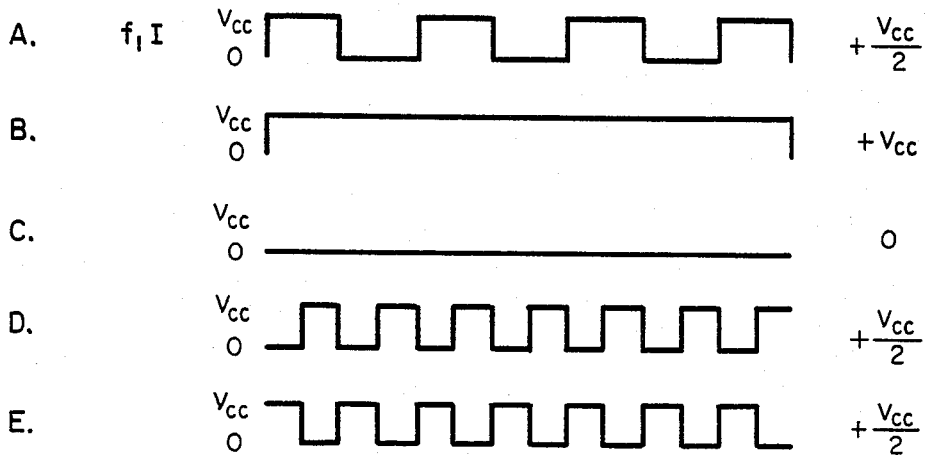
FIGS. 4A–4E are waveforms illustrating the operation of the embodiment of the invention illustrated in FIG. 1 under conditions where an in-phase $f_1$ signal as shown in FIG. 4A is received, FIGS. 4B–4E illustrating the outputs of each of the exclusive NOR gates for the $f_1$ frequency, respectively, as also shown in FIG. 1.

Referring now to FIGS. 5A-5E, the same conditions just described in FIG. 4 are here illustrated under circumstances where the input waveform, as illustrated in FIG. 5A, leads an in-phase $f_1$ signal by 45°. In FIGS. 5A-5E, time is again plotted along the abscissa, voltage in terms of the magnitude of the waveform is plotted along the ordinate, and the DC average of each waveform is indicated along the right-hand portion of the figure next to the waveform illustrated.

When the input waveform illustrated in FIG. 5A is applied to the input terminal 2, shown in FIG. 1, the output of the exclusive NOR gate 6, as shown in FIG. 5B, will be high only under conditions when both of the inputs thereto are high or both of the inputs thereto are low. This results, as may be readily appreciated upon a comparison of the waveforms illustrated in FIGS. 5A and 3A for the exclusive NOR gate 6, in an output waveform as shown in FIG. 5B which has an average value, as obtained from the output of the integrator 40 which corresponds to $\frac{3}{4} V_{cc}$. Conversely, as may be seen upon a comparison of the waveforms in FIGS. 5A and 3B, the output of the exclusive NOR gate 7 will take the form illustrated in FIG. 5C such that the same resides at a 1 level for only approximately 25 percent of the duration of the input waveform. This results in a DC average value of $\frac{1}{4} V_{cc}$ at the output of the integrator 41. The output of the exclusive NOR gate 8, as may be seen upon a comparison of the waveforms illustrated in FIGS. 5A and 3C, will take the form of the waveform illustrated in FIG. 5D which, as indicated, has a DC average value of approximately $\frac{3}{4} V_{cc}$ and such value will thus be present at the output of the integrator means 42. Conversely, the output of the exclusive NOR gate 9, as may be seen upon a comparison of the waveforms illustrated in FIGS. 5A and 3D, will take the form of the waveform illustrated in FIG. 5E which resides at the 1 level for only approximately 25 percent of the duration of the input waveform. Thus, the output of the integrator means 43 illustrated in FIG. 1 will, under these conditions, assume a value approximating $\frac{1}{4} V_{cc}$.

Figure 5:
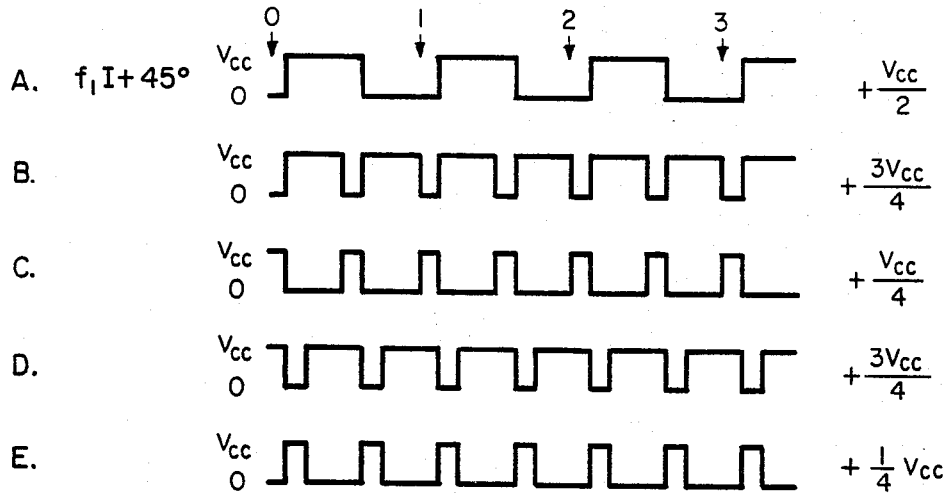
FIGS. 5A–5E are waveforms illustrating the operation of the embodiment of the invention illustrated in FIG. 1 under conditions where an $f_1$ input signal leading an in-phase $f_1$ signal by 45°, as shown in FIG. 5A, is received, FIGS. 5B–5E illustrating the outputs of each of the four exclusive NOR gates for the $f_1$ frequency, respectively, as also shown in FIG. 1.

Under the conditions illustrated in FIG. 5, the outputs of the exclusive NOR gates 6 and 8 will take the same form but are displaced by 45° and the same results obtain with respect to the outputs of the exclusive NOR gates 7 and 9 illustrated in FIGS. 5C and 5E. Thus, under these conditions, the threshold of the comparator means 44 and 46, as illustrated in FIG. 1, will be exceeded so that two high level inputs are supplied to the OR gate 48 to set the flip-flop 20 to indicate the presence of an $f_1$ input.

The FSK demodulator apparatus disclosed herein is viewed as highly advantageous in that the same manifests a high degree of accuracy and is not subject to drift. Furthermore, since the same fully avoids the use of analog filtering apparatus or phase-locked loop techniques, using instead digital correlation techniques, it is relatively inexpensive to manufacture and readily admits of fabrication as a monolithic integrated circuit which may be implemented in MOS or through the use of bipolar technologies. The FSK demodulator apparatus disclosed may also be readily incorporated within high speed modem apparatus for operation in dial-up telephone networks at speeds up to 1200 baud for use in a half-duplex mode.

Although the present invention has been disclosed in conjunction with rather a specific embodiment thereof, various alternatives and modifications to the specific structure and modes of operation, as set forth herein, will be readily apparent to those of ordinary skill in the art. For instance, numerous modifications and variations in the specific structure, as well as the logic and decoding techniques employed, will occur to those of ordinary skill in the art both from the standpoint of designing specific systems for specific applications, as well as for purposes of utilizing cost-effective approaches to the design, depending upon the modes of implementation relied upon. Furthermore, while the specific embodiment set forth herein has been specifically pointed toward implementation as a monolithic integrated circuit configured in MOS or bipolar technologies, it will be appreciated that hard-wired versions or hybrid versions of the instant invention are readily available and specific circuit functions may be varied to accommodate varying requirements in the mode of implementation employed.

Similarly, those of ordinary skill in the art will further recognize that certain variations in the detection circuits employed may also be adopted to suit the choice of design. In this regard, circuit redundancy within the detection circuit might be avoided by combining certain of the functions of the integrator or comparator means through the use of summing points or the like.

While the invention has been described in connection with several exemplary embodiments thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. FSK demodulator apparatus for detecting first and second frequencies of random phase occurring in an input signal, said FSK demodulator apparatus comprising:
   means for receiving said input signal;
   means for comparing said input signal with a plurality of reference signals having different phases for each of said first and second frequencies, said means for comparing producing a plurality of time varying outputs for each of said first and second frequencies;
   first means associated with said first frequency comprising first integrator means for obtaining a time average representation of said plurality of time varying outputs for said first frequency;
   second means associated with said second frequency comprising second integrators means for obtaining a time average representation of said plurality of time varying outputs for said second frequency; and
   responsive means comprising threshold detector means connected to each of said first and second integrator means for determining if said time average representation exceeds a predetermined threshold, thereby indicating that at least one time varying output has a duty cycle not equal to 50% and, therefore, that the first or second frequency associated therewith has been detected.

2. The FSK demodulator apparatus according to claim 1 said responsive means additionally comprising:
   logic means connected to said threshold detector means for generating a logical indication that said threshold detector means has determined that said time averaged representation exceeds said predetermined threshold level; and
   means for indicating the presence of said first or second frequency, said means for indicating having first and second states, said first state indicating that one of said first and second frequencies are present and said second state indicating that the other of said first and second frequencies are present, said means for indicating being connected to said logic means and being placed in said first and second states thereby.

3. The FSK demodulator apparatus according to claim 1 wherein said means for receiving comprises input terminal means and threshold detector means, said threshold detector means serving to prevent noise signals from being applied to said means for comparing.

4. The FSK demodulator apparatus according to claim 1 wherein said means for comparing comprises:
   a first plurality of logic means, each of said first plurality of logic means for comparing said input signal with a differing one of said plurality of reference signals for said first frequency; and
   a second plurality of logic means, each of said second plurality of logic means comparing said input signal with a differing one of said plurality of reference signals for said second frequency.

5. The FSK demodulator apparatus according to claim 4 wherein each of said first and second plurality of logic means comprises exclusive NOR gate means.

6. The FSK demodulator apparatus according to claim 4 additionally comprising:
   first reference frequency means for generating the plurality of reference signals for said first frequency and applying differing ones of said plurality of reference signals for said first frequency to each of said first plurality of logic means; and
   second reference frequency means for generating the plurality of reference signals for said second frequency and applying differing ones of said plurality of reference signals for said second frequency to each of said second plurality of logic means.

7. The FSK demodulator apparatus according to claim 6 wherein said first and second reference frequency means each generate in-phase, quadrature-phase, complement-phase and complement-quadrature-phase reference signals for said first and second frequencies, respectively.

8. The FSK demodulator apparatus according to claim 7 wherein each of said first and second reference frequency means comprises:
   input reference frequency means for receiving a reference frequency exceeding said first and second frequencies;
   means for dividing down said reference frequency to form a source reference signal having a value corresponding to twice said first or second frequency, respectively;
   means connected to said means for dividing down for halving the frequency of said source reference signal and outputing the resulting signal as said in-phase reference signal;
   means connected to said means for halving for inverting said resulting signal and outputting the same as said complement-phase reference signal;
   means for ANDing said source reference signal and said resulting signal to form said quadrature-phase reference signal; and
   means for inverting said quadrature-phase reference signal to form said complement-quadrature-phase reference signal.

9. The FSK demodulator apparatus according to claim 7 wherein each of said first and second plurality of logic means comprises exclusive NOR gate means.

10. The FSK demodulator apparatus according to claim 4 additionally comprising:

first reference frequency means for generating the plurality of reference signals for said first frequency and applying differing ones of said plurality of reference signals for said first frequency to each of said first plurality of logic means; and second reference frequency means for generating the plurality of reference signals for said second frequency and applying differing ones of said plurality of reference signals for said second frequency to each of said second plurality of logic means.

11. The FSK demodulator apparatus according to claim 10 wherein each of said first and second plurality of logic means comprises exclusive NOR gate means.

12. The FSK demodulator apparatus according to claim 11 wherein said first and second reference frequency means each generate in-phase, quadrature-phase, complement-phase and complement-quadrature-phase reference signals for said first and second frequencies, respectively.

13. The FSK demodulator apparatus according to claim 12 said responsive means additionally comprising:

logic means connected to said threshold detector means for generating said logical indications that said threshold detector means has determined that said time averaged representation exceeds said predetermined threshold; and means for indicating the presence of said first or second frequency, said means for indicating having first and second states, said first state indicating that one of said first and second frequencies are present and said second state indicating that the other of said first and second frequencies are present, said means for indicating being connected to said logic means and being placed in said first and second states thereby.

14. The FSK demodulator apparatus according to claim 13 wherein said means for receiving comprises input terminal means and threshold detector means, said threshold detector means serving to prevent noise signals from being applied to said means for comparing.

15. FSK demodulator apparatus for detecting first and second frequencies of random phase occurring in an input signal, said FSK demodulator apparatus comprising:

means for receiving said input signal;

means for comparing said input signal with a plurality of reference signals having different phases for each of said first and second frequencies, said means for comparing producing a plurality of time varying outputs for each of said first and second frequencies;

first means for integrating said plurality of time varying outputs for said first frequency to obtain first time averaged signals associated with said first frequency;

second means for integrating said plurality of time varying outputs for said second frequency to obtain second time averaged signals associated with said second frequency; and means responsive to one of said first and second time averaged signals exceeding a predetermined threshold for indicating the presence of the first or second frequency associated therewith.

16. The FSK demodulator apparatus according to claim 15 said means responsive additionally comprising:

threshold detector means connected to each of said first and second means, said threshold detector means determining if said time averaged signals exceed said predetermined threshold;

logic means connected to said threshold detector means for generating a logical indication that said threshold detector means has determined that said time averaged signals exceed said predetermined threshold; and means for indicating the presence of said first or second frequency, said means for indicating having first and second states, said first state indicating that one of said first and second frequencies are present and said second state indicating that the other of said first and second frequencies are present, said means for indicating being connected to said logic means and being placed in said first and second states thereby.

17. The FSK demodulator apparatus according to claim 15 wherein said means for receiving comprises input terminal means and threshold detector means, said threshold detector means serving to prevent noise signals from being applied to said means for comparing.

18. The FSK demodulator apparatus according to claim 15 wherein said means for comparing comprises:

a first plurality of logic means, each of said first plurality of logic means comparing said input signal with a differing one of said plurality of reference signals for said first frequency; and a second plurality of logic means, each of said second plurality of logic means comparing said input signal with a differing one of said plurality of reference signals for said second frequency.

19. The FSK demodulator apparatus according to claim 18 wherein each of said first and second plurality of logic means comprises exclusive NOR gate means.

20. The FSK demodulator apparatus according to claim 18 additionally comprising:

first reference frequency means for generating the plurality of reference signals for said first frequency and applying differing ones of said plurality of reference signals for said first frequency to each of said first plurality of logic means; and second reference frequency means for generating the plurality of reference signals for said second frequency and applying differing ones of said plurality of reference signals for said second frequency to each of said second plurality of logic means.

21. The FSK demodulator apparatus according to claim 20 wherein said first and second reference frequency means each generate in-phase, quadrature-phase, complement-phase and complement-quadrature-phase reference signals for said first and second frequencies, respectively.

22. The FSK demodulator apparatus according to claim 21 wherein each of said first and second reference frequency means comprises:

input reference frequency means for receiving a reference frequency exceeding said first and second frequencies;

means for dividing down said reference frequency to form a source reference signal having a value corresponding to twice said first or second frequency, respectively;

means connected to said means for dividing down for halving the frequency of said source reference signal and outputting the resulting signal as said in-phase reference signal;

means connected to said means for halving for inverting said resulting signal and outputting the same as said complement-phase reference signal;

means for ANDing said source reference signal and said resulting signal to form said quadrature-phase reference signal; and means for inverting said quadrature-phase reference signal to form said complement-quadrature-phase reference signal.

23. The FSK demodulator apparatus according to claim 22 wherein each of said first and second plurality of logic means comprises exclusive NOR gate means.

24. The FSK demodulator apparatus according to claim 23 said means responsive additionally comprising:

threshold detector means connected to each of said first and second means, said threshold detector means determining if said time averaged signals exceed said predetermined threshold;

logic means connected to said threshold detector means for generating a logical indication that said threshold detector means has determined that said time averaged signals exceed said predetermined threshold; and means for indicating the presence of said first or second frequency, said means for indicating having first and second states, said first state indicating that one of said first and second frequencies are present and said second state indicating that the other of said first and second frequencies are present, said means for indicating being connected to said logic means and being placed in said first and second states thereby.

25. The FSK demodulator apparatus according to claim 24 wherein said means for receiving comprises input terminal means and threshold detector means, said threshold detector means serving to prevent noise signals from being applied to said means for comparing.

* * * * *